US006917327B2

(12) United States Patent  (10) Patent No.: US 6,917,327 B2
Jenkins  (45) Date of Patent: Jul. 12, 2005

(54) ADDING ERROR CORRECTION AND CODING TO A RADAR SYSTEM

(75) Inventor: Alan Jenkins, Groton, MA (US)

(73) Assignee: M/A Com, Inc., Lowell, MA (US)

( * ) Notice: Subject to any disclaimer, the term of this patent is extended or adjusted under 35 U.S.C. 154(b) by 37 days.

(21) Appl. No.: 10/385,814

(22) Filed: Mar. 11, 2003

(65) Prior Publication Data

US 2004/0178952 A1 Sep. 16, 2004

(51) Int. Cl.⁷ .................... G01S 13/00; G01S 13/08
(52) U.S. Cl. .................. 342/202; 342/70; 342/145
(58) Field of Search ................. 342/70, 134, 145, 342/159, 189, 202, 203; 371/131; 375/140, 142, 242, 254, 340–343

(56) References Cited

U.S. PATENT DOCUMENTS 5,808,580 A  *  9/1998  Andrews, Jr. .............. 342/162
5,870,426 A  *  2/1999  Yokev et al. .............. 375/133
6,307,622 B1 * 10/2001 Lewis ...................... 356/4.01
6,587,072 B1 *  7/2003  Gresham et al. ............ 342/70
6,608,588 B2 *  8/2003  Elam ........................ 342/189

FOREIGN PATENT DOCUMENTS

DE       195 46 653 A1    6/1997
WO       WO 00/49426      8/2000

OTHER PUBLICATIONS

Skolnik, M, Radar Handbook, 2$^{nd}$ ed. 1990, 10.15–10.26.*

* cited by examiner

Primary Examiner—Bernarr E. Gregory
Assistant Examiner—Brian Andrea

(57) ABSTRACT

A method for transmitting a radar signal comprises the step of transmitting a series of pulses, each of the pulses being separated in time by an interpulse period, and each of the pulses in the series being modulated in accordance with a different character of a first code

47 Claims, 3 Drawing Sheets

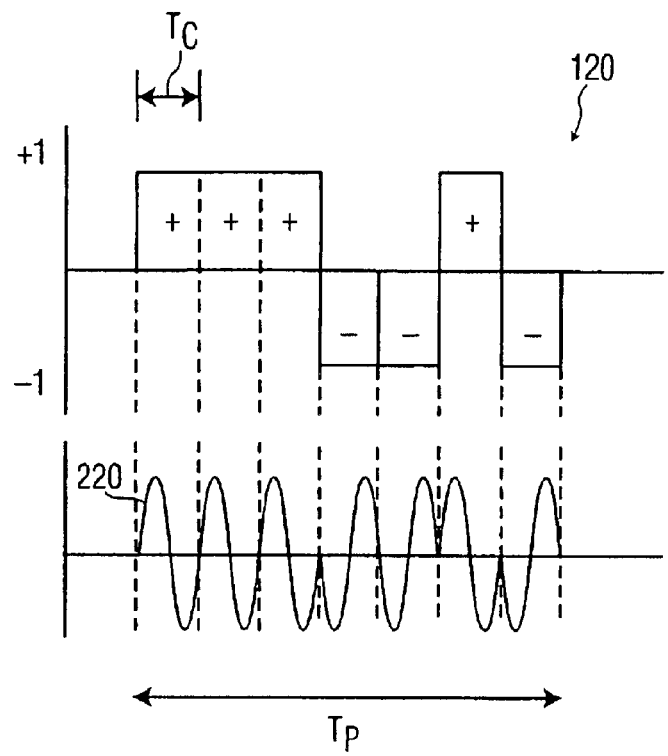
FIG. 2A
FIG. 2B
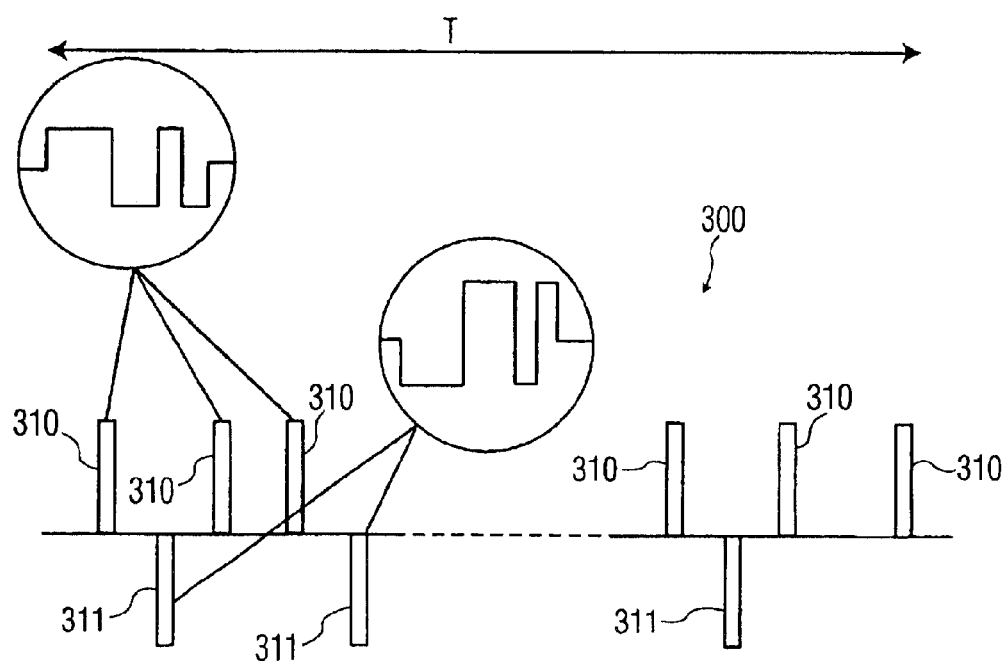
FIG. 3

ADDING ERROR CORRECTION AND CODING TO A RADAR SYSTEM

FIELD OF THE INVENTION

The invention relates generally to the field of radar, and more particularly to the application of error detection/correction techniques and/or coding techniques to a radar system.

BACKGROUND OF THE INVENTION

Radar (which is an acronym for RAdio Detection And Ranging) is a technique used to detect objects at a distance through the transmission of electromagnetic energy (usually at RF or microwave frequencies). Radar systems are used for a wide variety of purposes, including meteorological purposes (e.g., the NEXRAD system), e.g., to detect storm systems. Radars are used on board planes and ships to detect and track objects, both on the surface and in the air, for both military and commercial applications. Examples of such systems include AN/SPQ-9(b) naval radar system available from Northrop Grumman Norden Systems, Inc., which is used to detect surface vessels and small, low-flying objects such as missiles, and the Pathfinder commercial shipboard radar system available from Raytheon Corp., which is used to detect other ships and for navigational purposes. Radars are also used for collision avoidance on automobiles. It is also known to use radars for imaging, both for celestial and terrestrial objects. For example, the Joint Surveillance Target Attack Radar System (JSTARS) uses a synthetic aperture radar (SAR) mounted on the underside of a converted 707 airframe to form ground images which can reveal the presence of military vehicles such as tanks.

Radar systems can be either continuous wave or pulse types. In both types of systems, a portion of the energy transmitted toward an object by a transmitting antenna is reflected toward a receiving antenna to provide information about the object. In a continuous wave radar system, electromagnetic energy (typically at RF or microwave frequencies) is continuously transmitted, while in pulse radar systems, electromagnetic energy is transmitted in short bursts, or pulses, at a frequency referred to as the pulse repetition frequency, or prf The prf is often chosen based on the maximum expected range at which target detection is desired. This range is referred to as the unambiguous range. In such pulse systems, the pulses have a period, or pulse width, which is typically short as compared to the period between the pulses (which is the inverse of the prf). After a pulse is transmitted, a receiver "listens" for echoes of the transmitted pulse reflected by an object. If an echo is received, the object has been detected.

In pulse systems the range of an object can be determined by determining the time between the transmitted pulse and receipt of the echo (assuming that the range is less than the unambiguous range). If the transmitting and/or receiving antenna (the same antenna is often used for both functions) has directional properties, information concerning the bearing of the target may also be revealed by the echo.

Radar may also be used to determine relative velocity of an object with respect to the radar system. For example, in Doppler radar systems, frequency and/or phase shifts in the echo can reveal the relative velocity between object and system. In such pulse radar systems, echoes received from several pulses are often "batched" or combined (e.g., added and averaged). The echoes from a plurality of pulses that are combined in this fashion are often referred to as a batch. In a surveillance radar application, in which a rotating directional antenna with a beam width on the order of 5–10 degrees and a rotation rate of on the order of 1–10 seconds is utilized, batches of 2–16 pulses are typical, whereas batches of 50–250 pulses are more common to high resolution radar systems with non-rotating antennas, such as the type utilized in automobiles for collision avoidance. Batching serves to both increase the signal-to-noise ratio of the echo and to decrease the amount of processing required.

With radar systems, like any communication system, it is desirable to transmit information at the lowest cost and highest speeds possible. Radar systems, again like other communications systems, are also subject to degradation in performance resulting from interference and noise. This is especially true for radar systems such as collision avoidance radar systems on automobiles, in which each radar transmitter/receiver in the system is subject not only to interference from other transmitters in the system and/or on the vehicle, but also is potentially subject to interference from multiple other vehicles in the vicinity. Improving the performance of radar systems in the face of interference and noise has long been a goal of radar system engineers. While much progress has been made over the 60 or so years since radar has been in existence, improvement is still desirable and necessary.

What is needed is a system and method for reducing the effects of interference and noise in a radar system.

SUMMARY OF THE INVENTION

The present invention meets the aforementioned needs to a great extent by the present invention, in which known coding/error correction techniques are applied to radar systems to improve performance. In one highly preferred embodiment of the invention, particularly applicable to pulse radar systems, a direct sequence spread spectrum (also referred to as code division multiple access, or CDMA) technique is utilized. In this embodiment, a batch of pulses is treated as a symbol. The symbol is modulated by a pseudo-noise (PN) code, with each chip of the code corresponding to the period associated with a single pulse (i.e., the chip rate corresponds to the prf). The modulation technique is preferably bi-phase shift keying (BPSK); however, polyphase coding (e.g., QPSK) may also be used. The received echoes from each of the pulses in the symbol are combined, or correlated, as a function of the PN code. Viterbi decoding may be employed by the receiver. The PN code may be of any of the types commonly used in other communications systems, e.g., Gold codes, Walsh codes, Turbo codes, etc. In one preferred embodiment, the system also employs pulse coding.

BRIEF DESCRIPTION OF THE DRAWINGS

A more complete appreciation of the invention and many of the attendant features and advantages thereof will be readily obtained as the same become better understood by reference to the following detailed description when considered in connection with the accompanying drawings, wherein:

FIG. 2 is a time-domain representation of a single pulse showing bi-phase modulation according to an seven element Barker code according to a conventional process.

FIG. 3 is a schematic diagram illustrating the pulses in the batch of FIG. 1 after modulation by a pseudo-noise code according to an embodiment of the present invention.

DETAILED DESCRIPTION

The present invention will be discussed with reference to preferred embodiments of the invention. Specific details, such as types of modulation schemes and lengths of codes, are set forth in order to provide a thorough understanding of the present invention. The preferred embodiments discussed herein should not be understood to limit the invention. Furthermore, for ease of understanding, certain method steps are delineated as separate steps; however, these steps should not be construed as necessarily distinct nor order dependent in their performance.

Figure 1:
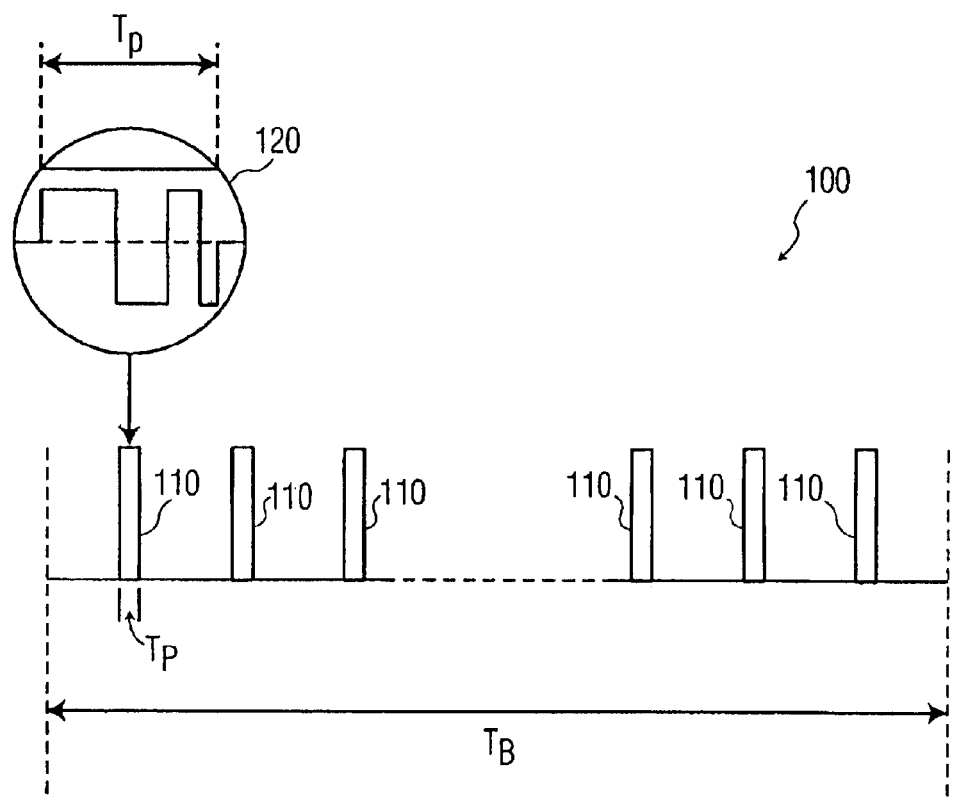
FIG. 1 is a schematic diagram illustrating a plurality of pulses and interpulse periods comprising a batch in a conventional process.

FIG. 1 illustrates a series of pulses 110 processed as a batch 100 with a period $T_B$. The pulses 110 of FIG. 1 are symbolic representations of actual pulses. Each pulse 110 represents a period of time in which a radar system transmits electromagnetic energy. In the period of time between pulses, referred to as the inter-pulse period, the radar system listens for echoes of the pulses reflected by objects. Each pulse 110 has a period $T_P$, which is sometimes referred to as the pulse width. An expanded time-base view of a pulse 110 is illustrated in cut out section 120. As can be seen from section 120, each pulse has been modulated.

FIG. 2(a) is a diagram of the symbolic representation of the pulse 110 of FIG. 1, while FIG. 2(b) is a representation of a corresponding waveform. Referring now to FIG. 2(a), it can be seen that pulse coding (also referred to as pulse modulation) has been applied to the pulse in a manner well known in the art. The pulse width $T_P$ has been divided into a number of sub-pulses referred to as chips, each with an equal sub-pulse period, or sub-pulse width, $T_C$. Each of the sub pulse periods $T_C$ is associated with a+ or − symbol. As can be seen with reference to FIG. 2(b), no phase modulation of the signal 220 occurs if the corresponding sub-pulse is associated with a + symbol, whereas a phase shift of 180 degrees occurs for those sub-pulse periods $T_C$ associated with a − symbol. The pattern of +s and −s is referred to as a code (which in this case is a 7 bit Barker code), and the process of modulating the pulse in accordance the code is referred to as pulse coding or pulse modulation. The modulation of a single pulse with a code shall be referred to herein as intrapulse coding. Although a 7 bit Barker code is illustrated in FIG. 2, it is possible to use Barker codes or other codes (e.g., of different lengths. Bi-phase coding/modulation (also referred to as BPSK, or binary phase shift keying) is illustrated in FIG. 2. However, polyphase (more than two phase) coding, e.g., Frank coding or Quadrature Phase Shift Keying (QPSK), may also be employed. As discussed more fully in M. Skolnik, Radar Handbook, 2$^{nd}$ ed. 1990 at pp. 10.15–10.26, the entirety of which is hereby incorporated by reference herein, phase coding is a form of pulse compression, which allows for additional power transmission and/or range resolution as compared to an uncompressed pulse.

Referring now back to FIG. 1, it can be seen that the exact same pulse 110 is transmitted a large number of times during the batch period $T_B$. As discussed above, the number of pulses in a batch can vary, but is typically on the order of 200 pulses per batch in a collision avoidance system for use with automobiles. The pulses in the batch 100 of FIG. 1 can be thought of as a unit of information, i.e., a symbol. Using spread spectrum techniques, it is possible to improve the performance of the communication (radar) system by coding this information unit/symbol. In particular, the symbol/batch can be coded using a direct sequence spread spectrum technique, which can be performed by modulating the symbol using any codes known for this purpose, including pseudo-noise (PN) codes such as those that are commonly used in CDMA applications.

Treating a series of pulses (such as the series of pulses in a batch) as a symbol and modulating each of the pulses in the batch in accordance with a code shall be referred to herein as interpulse modulation (as distinguished from intrapulse modulation, which refers to coding a single pulse). These codes are preferably orthogonal; that is, they have high autocorrelation (correlation with itself) with low cross-correlation (correlation with other codes). This means that when decorrelation is performed using any code other than the same code used to modulate the symbol, the output is approximately zero. It is possible to use codes such as Gold codes, Walsh codes and Turbo codes. A short code scheme, in which the code length equals the symbol length, may be used when the number of pulses in a batch is sufficiently large to provide for a sufficient number of unique codes. Long code schemes, in which the code length exceeds the symbol length, may also be used, especially where the number of pulses in a batch is small. Any type of modulation may be used, but in highly preferred embodiments of radar systems, especially those employing BPSK intrapulse modulation, BPSK modulation is preferred as this takes advantage of the bi-phase modulator that is already present the system.

An exemplary modulation scheme employing both intrapulse and interpulse modulation for a batch/symbol 300 according to one embodiment of the invention is illustrated in FIG. 3. The batch 300 comprises a plurality of pulses 310, 311. Some of the pulses 310 are intrapulse modulated in the same fashion as the pulse 110 of FIG. 1; that is, the pulses have been divided into sub-pulses (or chips), with each of the chips either left unchanged or phase shifted by 180 degrees in accordance with a 7 bit Barker code. Other of the pulses 311 are phase shifted versions of the pulses 310, with a phase shift of 180 degrees. Thus, the pulses in the batch 300 have been interpulse modulated. The pattern by which the pulses 310, 311 are shifted or left unshifted is dictated by a code associated with the system. The received echoes are de-correlated (de-spread) using the identical code.

In practice, each radar transmitter is assigned a different PN code, much in the same way that each cell phone is assigned a different PN code in a typical CDMA system. These radar transmitters may be located on a single vehicle or may be located on a plurality of vehicles. Thus, the invention may be used to reduce interference between radar transmitters on the same automobile as well as interference from other vehicles when used in an automobile collision avoidance radar system. If a short code scheme is used, the number of different possible codes depends upon the number of "chips" in the symbol, which in this case is the number of pulses in the batch. In a system that batches 200 pulses, a large number of orthogonal codes are available for assignment to individual transmitters.

Figure 4:
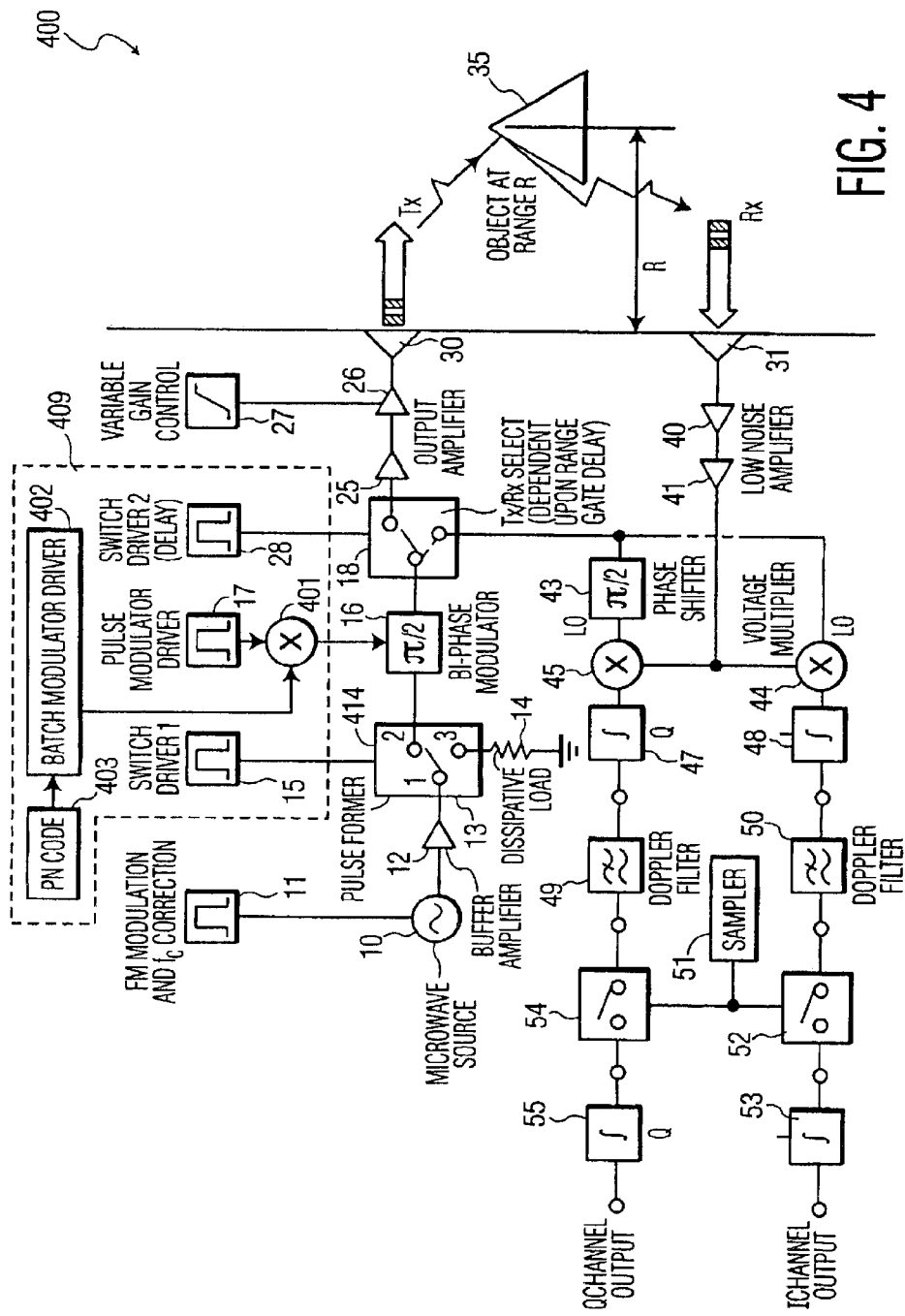
FIG. 4 is a hardware block diagram of a radar system employing the modulation scheme of FIG. 2 according to an embodiment of the present invention.

A block diagram of an embodiment of a system 400 according to one embodiment of the invention is illustrated in FIG. 4, which is similar to FIG. 1 of the aforementioned co-pending application. In FIG. 4, a microwave source 10 is stabilized by FM modulation module 11. The output of the microwave source is amplified and buffered (to prevent frequency pulling) by buffer amplifier 12. The output of buffer amplifier 12 is input to a pulse former 414, which is controlled by switch driver 15 to form a pulse with the desired pulse width. The pulse from the pulse former 414 is input to bi-phase modulator 16, which performs the intrapulse and interpulse bi-phase modulation. The bi-phase modulator 16 is controlled by the output of an XOR gate 401. One input to the XOR gate 401 is connected to pulse modulator driver 17, which is responsible for supplying a waveform that corresponds to the Barker code for intrapulse modulation (pulse compression) purposes. Thus, the waveform output by pulse modulator driver 17 corresponds to the waveform of FIG. 2(*a*). The other input to the XOR gate 401 is connected to batch modulator driver 402, which uses the PN code stored in the PN code memory 403 to output a waveform that varies in accordance with the PN code over the batch period to perform the interpulse modulation function. Thus, the XOR gate 401 combines the waveforms produced by the pulse modulator driver 17 and the batch modulator driver 402 in order to control the bi-phase modulator 16 to produce the interpulse and intrapulse-modulated output symbolically represented in FIG. 3. The output of the bi-phase modulator is then input to transmit/receive switch 18, which is controlled by switch driver 28 such that the output of the bi-phase modulator 16 is connected to amplifiers 25 and 26 for transmission through antenna 30 during the transmit cycle, and input to the local oscillator inputs of I and Q mixers 44 and 45 of the receiver during the receive cycle.

In a highly preferred embodiment, the functions performed by the elements 15, 17, 28, 401, 402 and 403 enclosed by dashed line 409 are implemented in a single integrated circuit such as a programmable gate array or an ASIC. However, the elements in dashed line 409 may also be implemented using discrete components.

Signals received through antenna 31 are amplified by amplifiers 40, 41 and then divided and input to mixers 44, 45, which mixes the input signal with a replica of the transmitted pulse and a replica of the transmitted pulse that is phase-shifted by 90 degrees (to form the quadrature portion of the received signal), respectively. The downconverted output of the mixers 44, 45 are then connected to integrators 47, 48, which perform the decorrelation function corresponding to the intrapulse modulation. The output of the integrators 47, 48 are then Doppler-filtered by filters 49, 50. The output of the Doppler filters 49, 50 are connected to switches 52, 54, which are controlled by sampler 51 to perform an integrate-and-dump process as is well known in the art. The output of the switches 52, 54 are connected to second stage integrators 53, 55, respectively.

The microwave frequency source 10 is employed in and received signals are down-converted directly to baseband in FIG. 4. As will be readily understood by those of skill in the art, it is also possible to employ include an intermediate frequency (IF) oscillator in the transmitter and downconvert the received signals to IF before they are downconverted to baseband. In such a scheme, the bi-phase modulation may be performed at IF instead of at the transmitted frequency as shown in FIG. 4. Furthermore, the decorrelation scheme illustrated in FIG. 4 is but one method for decorrelating the received signal. Other forms of decorrelation, including Viterbi decoding, may also be used.

An interpulse modulation scheme has been illustrated and preferred embodiments of a radar system employing an interpulse modulation scheme has been set forth. Obviously, numerous modifications and variations of the present invention are possible in light of the above teachings. It is therefore to be understood that within the scope of the appended claims, the invention may be practiced otherwise than as specifically described herein.

What is claimed is:

1. A method for transmitting a radar signal comprising the step of:
   transmitting a series of pulses, each of the pulses being separated in time by an interpulse period, and each of the pulses in the series being modulated in accordance with a different character of a first code,
   wherein each of the series of pulses comprise a plurality of sub-pulses of substantially equal pulse width.

2. The method of claim 1, wherein the modulation is binary phase modulation.

3. The method of claim 1, wherein the series of pulses comprise a batch.

4. The method of claim 3, wherein a length of the first code is equal to a number of pulses in the batch.

5. The method of claim 1, wherein there is a one-to-one correspondence between a pulse and a character in the first code.

6. The method of claim 1, wherein in the first code is a pseudo-noise code.

7. The method of claim 1, wherein the first code is a Walsh code.

8. The method of claim 1, wherein the first code is a Turbo code.

9. The method of claim 1, wherein the first code is a Gold code.

10. The method of claim 1, further comprising the steps of:
    receiving electromagnetic energy during a plurality of interpulse periods between the pulses in the series; and
    decorrelating the received electromagnetic energy in accordance with the first code.

11. The method of claim 1, further comprising the step of coding each pulse in the series of pulses by modulating each pulse with a pulse code, the pulse code comprising a plurality of pulse code characters, a portion of each pulse being modulated in accordance with a pulse code character.

12. The method of claim 11, wherein the step of modulating each pulse with a pulse code is performed using a type of modulation that is a same type of modulation that is used to modulate each pulse in accordance with the first code.

13. The method of claim 12, wherein the type of modulation is binary phase modulation.

14. A method for operating a plurality of radar transmitters in proximity to each other comprising the steps of:
    assigning a code to each of a plurality of radar transmitters, the code assigned to each one of the radar transmitters being different from codes assigned to other radar transmitters in the plurality of transmitters; and
    transmitting a series of pulses from each of the transmitters, each of the series of pulses being interpulse modulated in accordance with said code assigned to the transmitter, wherein each of the series of pulses comprise a plurality of sub-pulses of substantially equal pulse width.

15. The method of claim 14, wherein each of the plurality of transmitters is located on a single vehicle.

16. The method of claim 14, wherein at least one transmitter is located on a first vehicle and at least one transmitter is located on a second vehicle.

17. The method of claim 14, wherein the interpulse modulation is binary phase modulation.

18. The method of claim 14, wherein the each of the series of pulses comprises a batch.

19. The method of claim 18, wherein a length of the first code is equal to a number of pulses in the batch.

20. The method of claim 14, wherein there is a one-to-one correspondence between a each pulse and a single character in the first code.

21. The method of claim 14, wherein in the first code is a pseudo-noise code.

22. The method of claim 14, wherein the first code is a Walsh code.

23. The method of claim 14, wherein the first code is a Turbo code.

24. The method of claim 14, wherein the first code is a Gold code.

25. The method of claim 14, further comprising the steps of:
   receiving electromagnetic energy during a plurality of interpulse periods between the pulses in the series at each of the transmitters; and
   decorrelating electromagnetic energy received in the receiving step in accordance with a respective code at each of the transmitters.

26. The method of claim 14, further comprising the step of coding each pulse in the series with an intrapulse modulation scheme.

27. The method of claim 26, wherein the intrapulse modulation and the interpulse modulation are performed using a same type of modulation.

28. A radar system comprising:
   a transmitter, the transmitter being connectable to an antenna, the transmitter being configured to transmit a series of pulses, the series of pulse being interpulse modulated in accordance with a first code wherein each of the series of pulses comprise a plurality of sub-pulses of substantially equal pulse width; and
   a receiver, the receiver being connectable to the antenna, the receiver being configured to receive echoes from the series of pulses from the antenna and to decorrelate the echoes in accordance with the first code.

29. The radar system of claim 28, wherein the transmitter includes a binary phase modulator for modulating the series of pulses.

30. The radar system of claim 28, wherein the receiver is configured to batch the echoes received from the series of pulses.

31. The radar system of claim 30, wherein a length of the first code is equal to a number of pulses batched by the receiver.

32. The radar system of claim 28, wherein a length of the first code is greater than a number of pulses batched by the receiver.

33. The radar system of claim 28, wherein in the first code is a pseudo-noise code.

34. The radar system of claim 28, wherein the first code is a Walsh code.

35. The radar system of claim 28, wherein the first code is a Turbo code.

36. The radar system of claim 28, wherein the first code is a Gold code.

37. The radar system of claim 28, wherein the transmitter is further configured to intrapulse modulate each pulse in accordance with a pulse code.

38. The radar system of claim 36, wherein the intrapulse modulation is performed using a same type of modulation as the interpulse modulation.

39. The radar system of claim 37, wherein the type of modulation is binary phase modulation.

40. A radar transmitter comprising:
   an oscillator;
   a pulse former connected to the oscillator, the pulse former being configured to provide a series of pulses at an output, the pulses being separated in time, wherein each of the series of pulses comprise a plurality of sub-pulses of substantially equal pulse width; and
   a modulator connected to the output of the pulse former, the modulator being configured intrapulse modulate the series of pulses in accordance with a first code.

41. The radar transmitter of claim 37, wherein the modulator is a bi-phase modulator.

42. The radar transmitter of claim 40, wherein the first code is a Walsh code.

43. The radar transmitter of claim 40, wherein the first code is a Turbo code.

44. The radar transmitter of claim 40, wherein the first code is a Gold code.

45. The radar transmitter of claim 40, wherein the first code is a pseudo-noise code.

46. The radar transmitter of claim 40, wherein the modulator is further configured to intrapulse modulated each pules of the series in accordance with a pulse code.

47. The radar transmitter of claim 46, wherein the pulse code is a Barker code.

* * * * *